United States Patent [19]

Ries et al.

[11] Patent Number: 4,710,809
[45] Date of Patent: Dec. 1, 1987

[54] METHOD FOR THE REPRESENTATION OF VIDEO IMAGES OR SCENES, IN PARTICULAR AERIAL IMAGES TRANSMITTED AT REDUCED FRAME RATE

[75] Inventors: Joachim Ries; K. Heinrich W. Dörgeloh, both of Braunschweig, Fed. Rep. of Germany

[73] Assignee: Deutsche Forschungs-und Versuchsanstalt fur Luft- und Raumfahrt e.V., Cologne, Fed. Rep. of Germany

[21] Appl. No.: 878,318

[22] Filed: Jun. 25, 1986

[30] Foreign Application Priority Data

Jun. 29, 1985 [DE] Fed. Rep. of Germany ....... 3523424

[51] Int. Cl.$^4$ .......................... H04N 7/18; H04N 7/12
[52] U.S. Cl. .................................... 358/109; 358/136; 358/105
[58] Field of Search ............... 358/105, 108, 109, 135, 358/136, 138

[56] References Cited

U.S. PATENT DOCUMENTS 4,383,272 5/1983 Netravali et al. ................... 358/136
4,460,923 7/1984 Hirano et al. ....................... 358/136
4,496,972 1/1985 Lippmann et al. .................. 358/136

FOREIGN PATENT DOCUMENTS 3408016 9/1985 Fed. Rep. of Germany .
3408061 9/1985 Fed. Rep. of Germany .

OTHER PUBLICATIONS

"Advances in Picutre Coding", by H. G. Mussmann et al., Proceedings of the IEEE, vol. 73, No. 4, Apr. 1985, pp. 523-548.

Primary Examiner—James J. Groody
Assistant Examiner—Michael D. Parker
Attorney, Agent, or Firm—Gottlieb, Rackman & Reisman

[57] ABSTRACT

The invention relates to a method for the representation of video image sequences or scenes with a relative movement between a pick-up sensor and the viewed scene, such scenes being transmitted at reduced frame rate. By interpolation and/or extrapolation on the basis of two transmitted frames intermediate frames are generated on the receiving end of the transmission line and inserted into the transmitted frame sequence. The positions of image points (pels) which are identical in the two transmitted images are determined from the relationship of the pel positions for at least two identical pels on different vertical and horizontal coordinates in each of the two transmitted frames. Before reconstruction of the intermediate frames the mean brightness values for limited picture areas which represent the environment of at least one of the corresponding pels in two successive transmitted frames are determined. These brightness values are subtracted or divided and the brightness value in the extrapolation zone of the intermediate frames is corrected in accordance with the resulting differences or quotients.

6 Claims, 4 Drawing Figures

4,710,809

METHOD FOR THE REPRESENTATION OF VIDEO IMAGES OR SCENES, IN PARTICULAR AERIAL IMAGES TRANSMITTED AT REDUCED FRAME RATE

The invention relates to a method for the representation of video image sequences or scenes with a relative movement between a pick-up sensor and the viewed scene, such scenes being transmitted at reduced frame rate.

BACKGROUND OF THE INVENTION

The invention refers to a method and an apparatus for the representation of video images, pictures or senses, in particular aerial pictures with a relative movement between a pick-up sensor and the scene transmitted at reduced frame rate, in which by interpolation and/or extrapolation on the basis of two transmitted frames intermediate frames are generated and inserted into the transmitted frame sequence and in which the positions of picture elements on pels which are identical in the two transmitted frames are determined from the relationship of the positions of at least two pels on different vertical and horizontal coordinates in each of the two transmitted frames as described in U.S. Pat. No. 4,496,972, to which reference is made.

DESCRIPTION OF THE PRIOR ART

The intermediate frames are constructed of two reference frames recorded at different times (e.g. 1 second apart) whose frame information partly overlaps.

In general with a frame movement in the x and y direction an intermediate frame K inserted in the sequence possesses three zones containing information of at least one of two reference frames. In the overlap zone of the two reference frames O and N information from both frames O and N is available. Two further zones include information only present in one of the two reference frames O or N. In further zones there is no reference frame information.

The intermediate frames are composed according to these conditions. Interpolation between the grey values of the frames O and N is possible in the overlap zone. By weighting the grey values depending on the time distance of the intermediate frame to be reconstructed from the reference frames a gradual changeover of the grey values from frame O to frame N can be reached. The zones for which information is available only from one of the two reference frames are taken directly from the relevant frame, i.e. without weighting depending on the time distance (extrapolation), compare German specification DE-OS No. 34 08 061. As an alternative to the interpolation the extrapolation can be extended to the overlap zone. Zones with no reference frame information are given a predetermined grey value, e.g. medium grey value.

If the lighting conditions between the recordings of two successive reference or transmitted frames change then the average brightness (i.e. the mean value of the grey value distribution) can differ in the extrapolation zone of the intermediate frames and in the interpolation zone or in parts of these zones. This difference affects the reproduction quality of the intermediate frames and has a negative visual effect particularly at junctions between these zones, occurring as an abrupt change in the grey level.

The object of the invention is to reduce the abrupt brightness changes at the junctions between interpolation zones and extrapolation zones where information from just one reference frame is available.

SUMMARY OF THE INVENTION

The invention solves this task by a method for the representation of video images, pictures or scenes, in particular aerial pictures with a relative movement between a pick-up sensor and the scene transmitted at reduced frame rate, in which by interpolation and/or extrapolation on the basis of two transmitted frames intermediate frames are generated and inserted into the transmitted frame sequence and in which the positions of pels which are identical in the two transmitted frames are determined from the relationship of the positions of at least two pels on different vertical and horizontal coordinates in each of the two transmitted frames, wherein before reconstruction of the intermediate frames for limited picture areas which represent the environment of the position of at least one of the corresponding picture elements (pels) in two transmitted frames the mean brightness values of these picture areas are determined, these brightness values are subtracted or divided and the brightness value in the extrapolation zone of the intermediate frames is corrected according to the resulting differences or quotients.

Further features of the invention are described with reference to the drawings.

The process involved expands the existing intermediate frame interpolation process so that the average brightness of the extrapolation and interpolation zones over the frame can be matched to reduce the brightness changes stated above and therefore avoids the negative visual effects.

DESCRIPTION OF THE DRAWING

The present invention will be more readily appreciated by reference to the following detailed description when read in light of the accompanying drawing in which.

DETAILED DESCRIPTION

Figure 1:
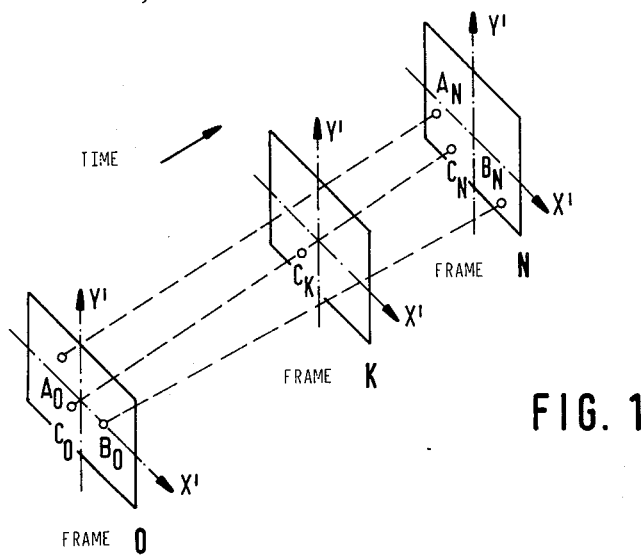
FIG. 1 illustrates the principle of reconstruction of intermediate frames from reference frames.

FIG. 1 shows the time relationship of two transmitted or reference frames (O and N) and an intermediate frame (K) reconstructed on the receiving end of a transmission line and having the picture element (pel) positions $A_O$, $A_N$ and $B_O$, $B_N$ respectively determined by measurement as well as the allocated picture elements $C_K$, $C_O$ and $C_K$, $C_N$ respectively determined by calculation based on a linear model.

The relationship between the pel position of an object and time, i.e. its displacement between different frames, is determined by the laws of optical projection and geometry. It can be approximated by a linear characteristic, as shown in FIG. 1. If the positions of corresponding pels in the two reference frames are known, for example positions $A_O$, $B_O$ in frame O and $A_N$, $B_N$ in frame N, the remaining pels of the picture field, e.g. for the pels $C_O$, $C_N$ can be determined from the relationship of the distance between the pels in accordance with the Ray Ratio Law. The relationship of the distance between the pel $C_O$ and $C_N$ with the coordinates $x'_{CO}$, $y'_{CO}$ and $x'_{CN}$, $y'_{CN}$ and the relevant pel $C_K$ with the coordinates $x'_{CK}$, $y'_{CK}$ in a frame K is characterized by a specific straight line between frames O and N and can be determined from the coordinate relationship in a known manner as described in U.S. Pat. No. 4,496,972.

Figure 2:
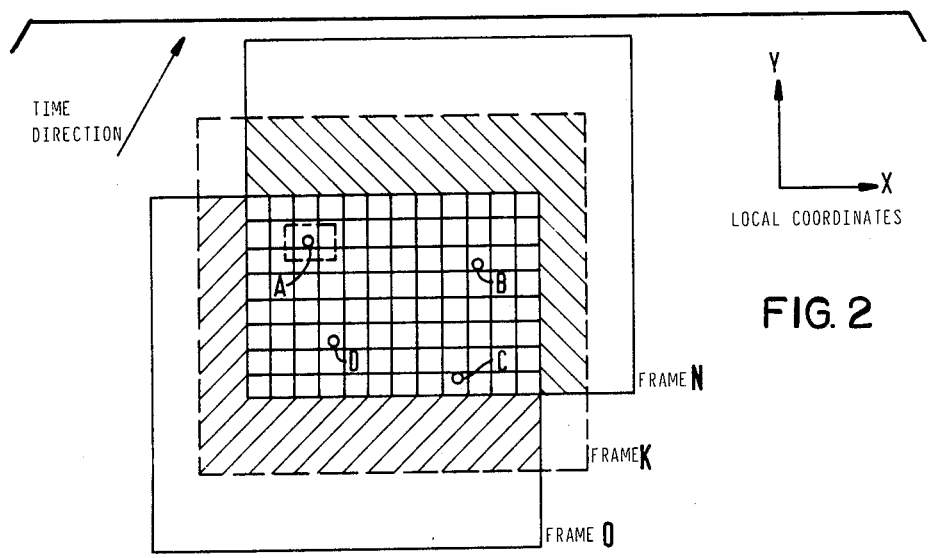
FIG. 2 shows an intermediate frame reconstructed from two reference frames and positioned between the latter, the view being along the time axis in the sense illustrated in FIG. 1.
Figure 2A:
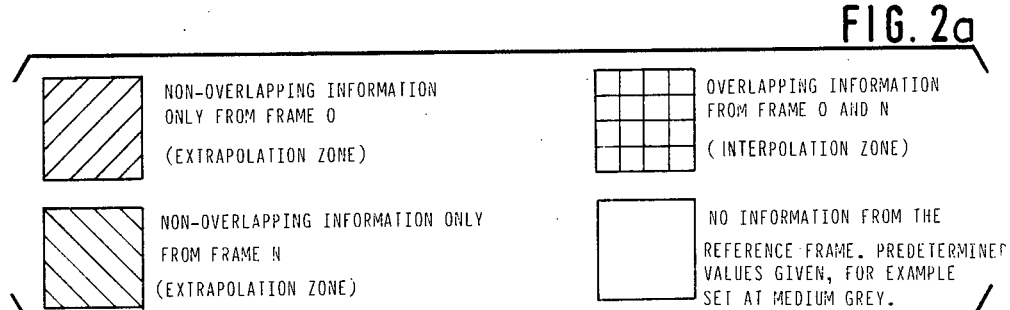
FIG. 2a represents a key for identifying the various sections of the frames shown in FIG. 2.

FIG. 2 shows the reference frames O and N which are displaced in time and according to their coordinates x and y. In addition the intermediate frame K to be reconstructed is shown by the broken lines. As illustrated in FIG. 2 and having reference to the key in FIG. 2a as well, the overlapping zone indicated by square hatching contains information from both frames O and N. No overlap occurs in the areas with oblique hatchings. Information for these zones is available from one of the successive frames O and N, i.e. the zone with hatching slanting downwardly to the right is from frame N and the zone with the hatching slanting downwardly to the left is from frame O. Whilst the pels in the overlapping zone can be reconstructed by interpolation, those in the non-overlapping zone are extrapolated using the information from one of the reference frames. For zones for which no information is available, predetermined grey values are given, for example a medium grey.

The above shows that with major changes in the mean brightness values between successive reference frames a smooth changeover from the brightness of one frame to the next is only guaranteed in the overlapping zone where interpolation is possible. In the extrapolation zone only information from one of the reference frames is available. This leads to sudden changes in the grey value and therefore in the brightness at the junction between the interpolation zone and the adjacent extrapolation zones. Such abrupt grey changes have a negative visual effect.

Such abrupt changes are largely avoided by the process to be described below. This process uses the average brightness resulting from brightness averagings of limited picture areas which correspond in both reference frames. Displacement measurement techniques which can supply the positions of the matching pels in the frames or displacement values for those pels required for the interpolation of the intermediate frame and which operate according to area correlation processes provide mean brightness values of corresponding picture zones in both reference frames.

The difference in the average brightness of corresponding picture areas are used to determine the parameters of a function which is used to correct the brightness in the corresponding picture areas in the intermediate frame for any pel in the intermediate frame in the case of extrapolation. The parameters are determined by solving a system of linear equations containing the brightness differences as well as their coordinates in one of the reference frames.

The process represents an improvement over the weighted interpolation of pels in intermediate frames in that exposure differences in successive reference frames no longer result in noticeable abrupt brightness changes at the junctions between interpolation and extrapolation zones.

Details of the process are described in the following.

From two successive reference frames O and N a number "n" of corresponding limited areas is selected. The actual number depends on the content of the reference frames. Corresponding limited picture areas are referred to hereinafter as picture area pairs. The size of picture areas is variable and can be e.g. 20×20 pels. Corresponding pairs of pels which are required to reconstruct the intermediate frames known from the displacement measurement techniques can be used as the centre of said picture area pairs.

Figure 3:
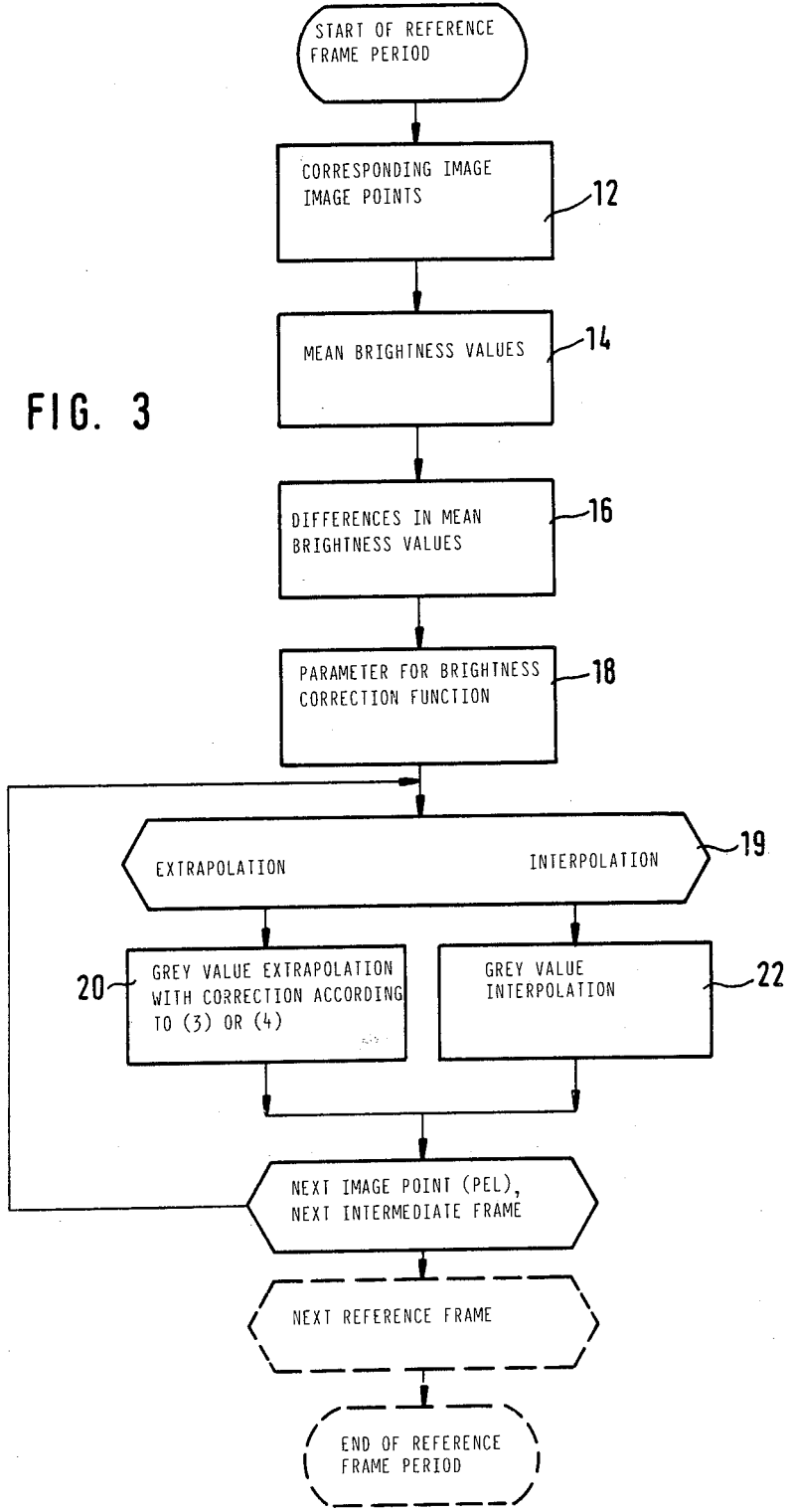
FIG. 3 is a block flow diagram illustrating an intermediate frame reconstruction with adjusted brightness.

Such a picture area is represented in FIG. 2 by the broken line around pel A. In the reference frame O the pel in the centre of this picture area has the coordinates $A_o=(x_{oA}, y_{oA})$ and in reference frame N said pel has the coordinates $A_N=(x_{NA}, y_{NA})$. FIG. 2 shows further pels B, C and D to which corresponding pairs of picture areas in two successive frames are allocated. The determination of the correspondence between reference frames O and N resulting therefrom and the determination of the centre pels of the picture areas is carried out in block 12 of the flow diagram shown in FIG. 3. For each of the picture areas in the two successive frames O and N respectively a means value of the brightness $\mu_{oi}$ and $\mu_{Ni}$ (FIG. 3, block 14) is to be determined and thereafter the difference between these mean values (FIG. 3, block 16) in accordance with the formula:

$$\mu_{Di} = \mu_{Ni} - \mu_{oi} \tag{1}$$

The differences together with the corresponding frame coordinates of pels $A_o$, $B_o$, $C_o$, $D_o$ ... or $A_N$, $B_N$, $C_N$, $D_N$ ... are used in a system of preferably linear equations where the solution produces the parameters $a_1$ ... $a_n$ for the brightness correction function (2) set forth below (block 18).

In this "n" represents the number of corresponding picture areas. For example (if n=4):

$$\mu_D(x_o, y_o) = a_1 x_o y_o + a_2 x_o + a_3 y_o + a_4 \tag{2}$$

Alternatively the coordinates in reference frame O ($x_o$, $y_o$) or in reference frame N ($x_N$, $y_N$) corresponding to the mean values can be used as reference variables in the formula, for example in (2).

The grey value of a pel in an intermediate frame to be determined in the extrapolation zone can be calculated according to the extended interpolation formulae (3) and (4), block 20.

$$I_K(o) = I_o(X_o, y_o) + g^{(o)}(K,N) \mu_D(x_o, y_o) \tag{3}$$

$$I_K^{(N)} = I_N(x_N, y_N) + g^{(N)}(K,N) \mu_D(x_o, y_o) \tag{4}$$

with for example $$g^{(o)}(K,N) = K/N \tag{5}$$

$$g^{(N)}(K,N) = K - N/N \tag{6}$$

the time-weighting factors $g^{(o)}$ and $g^{(N)}$ determine the time related continuous changeover in the brightness correction between reference frames O and N. The formulae (5) and (6) indicate the special case of time-linear changeover.

The above describes the process on the basis of subtraction of the mean brightness values. A division of the mean brightness values can also be used according to the following formulae:

$$v_i = \mu_{Ni}/\mu_{oi} \qquad (7)$$

$$v_i(x_o, y_o) = a_1 x_o y_o + a_2 x_o + a_3 y_o + a_4 \qquad (8)$$

$$I_K^{(o)} = g^{(o)} v(x_o, y_o) I_o(x_o, y_o) \qquad (9)$$

$$I_K^{(N)} = g^{(N)} 2/v(x_o, y_o) I_N(x_N, y_N) \qquad (10)$$

Symbols $\mu_{oi}$: Mean brightness value in reference frame O relating to matching pel i.

$\mu_{Ni}$: Mean brightness value in reference frame N relating to matching pel i.

$\mu_{Di}$: Difference between corresponding mean values relating to matching pel i.

$v_{Di}$: Quotient of corresponding mean values.

$\mu_D(x_o, y_o)$: Function of brightness differences.

$v_D(x_o, y_o)$: Function of brightness quotients.

$a_1, a_2, a_3 \ldots a_n$: Coefficients, with n being the number of corresponding picture areas.

$x_o, y_o$: Pel coordinates for frame O.

$x_N, y_N$: Pel coordinates for frame N.

N: Number of intermediate frames plus the latest frame.

K: Position ($O < K < N$) of an intermediate frame between two reference frames.

$I_K^{(o)}$: Grey value of a pel in the intermediate frame in the position K when only a pel reference to the frame O exists (extrapolation zone).

$I_K^{(N)}$: Grey value of a pel in the intermediate frame in the position K where only a pel reference exists to the reference frame N (extrapolation zone).

$g^{(o)}(K,N)$: Time-weighting factor according to the intermediate frame position K in respect to the reference frame O.

$g^{(N)}(K,N)$: Time-weighting factor according to the intermediate frame position K in respect to reference frame N.

What we claim as our invention and desire to secure by Letters Patent of the United States is:

1. A method for the representation of video images, pictures or scenes, in particular aerial pictures with a relative movement between a pick-up sensor and the scene transmitted at reduced frame rate, said method comprising the steps of: generating, by interpolation or by extrapolation or by both interpolation and extrapolation on the basis of two transmitted frames, at least one intermediate frame; inserting said at least one intermediate frame into a transmitted frame sequence; determining the positions of picture elements (pels) identical in the two transmitted frames from the relationship of the positions of at least two pels on different vertical and horizontal coordinates in each of the two transmitted frames; determining, before reconstruction of said at least one intermediate frame for limited picture areas which represent the environment of the position of at least one of the corresponding pels in said two transmitted frames, the mean brightness values of these picture areas; subtracting or dividing these mean brightness values; and correcting the brightness value in the extrapolation zone of said at least one intermediate frame for which brightness values from only one of the transmitted frames of a frame sequence are available according to the resulting differences or quotients.

2. Method according to claim 1, wherein the mean brightnesses of said limited picture areas around the positions of at least four corresponding pels are used as the basis for extrapolation.

3. Method according to claim 1 or 2, wherein the pels chosen for said limited picture areas are those pels which are selected to form the basis for reconstructing the intermediate frames.

4. Method according to claim 1, wherein from at least two differences or quotients a function of the dependencies of each said limited picture area is derived.

5. Method according to claim 4, wherein differences or quotients in the brightness values for further pel positions are calculated from said function with the coordinates of these further pel positions as variables.

6. Method according to claim 4, wherein the function is a polynomial of the first order of the coordinates of one of the images transmitted.

* * * * *